United States Patent
Wang et al.

(10) Patent No.: US 7,509,844 B2
(45) Date of Patent: Mar. 31, 2009

(54) ATOMIC FORCE MICROSCOPE TECHNIQUE FOR MINIMAL TIP DAMAGE

(75) Inventors: Chikuang C. Wang, San Jose, CA (US); Yuri S. Uritsky, Newark, CA (US); Thai Cheng Chua, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 121 days.

(21) Appl. No.: 11/421,396

(22) Filed: May 31, 2006

(65) Prior Publication Data
US 2007/0277599 A1 Dec. 6, 2007

(51) Int. Cl.
G01B 5/28 (2006.01)
G01B 7/34 (2006.01)

(52) U.S. Cl. ........................ 73/105; 250/307
(58) Field of Classification Search ............... 73/105; 250/307
See application file for complete search history.

(56) References Cited

U.S. PATENT DOCUMENTS

| | | | | |
|---|---|---|---|---|
| 5,866,807 A | | 2/1999 | Elings et al. | |
| RE36,488 E | * | 1/2000 | Elings et al. | 250/234 |
| 6,079,254 A | * | 6/2000 | Chen et al. | 73/105 |
| 2004/0020279 A1 | * | 2/2004 | Degertekin et al. | 73/105 |
| 2006/0260388 A1 | * | 11/2006 | Su et al. | 73/105 |
| 2006/0261264 A1 | * | 11/2006 | Warren et al. | 250/234 |
| 2007/0033991 A1 | * | 2/2007 | Rice et al. | 73/105 |
| 2007/0075243 A1 | * | 4/2007 | Kneeburg et al. | 250/306 |

OTHER PUBLICATIONS

Ricardo Garcia et al., "Attractive and repulsive tip-sample interaction regimes in tapping-mode atomic force microscopy," Physical Review B, Aug. 1999 vol. 60(7): pp. 4961-4967.

* cited by examiner

Primary Examiner—Michael Cygan
(74) Attorney, Agent, or Firm—Patterson & Sheridan LLP (57) ABSTRACT

Methods and apparatus for automatically determining a feedback setpoint for use in operating an atomic force microscope (AFM) are provided. The setpoint may be determined by modulating a feedback setpoint while monitoring for a change in a detector signal. In an effort to avoid tip damage and remain in non-contact, attractive mode during use, a setpoint just above a setpoint corresponding to a detected change in a parameter of the detector signal, such as an abrupt change in phase, may be used to operate the AFM.

6 Claims, 8 Drawing Sheets

ATOMIC FORCE MICROSCOPE TECHNIQUE FOR MINIMAL TIP DAMAGE

BACKGROUND OF THE INVENTION

1. Field of the Invention

Embodiments of the present invention generally relate to a method of using an atomic force microscope (AFM), and more particularly to a method of determining a feedback setpoint value for use in operating the AFM.

2. Description of the Related Art

The surface roughness and morphology of gate dielectrics and other semiconductor thin films are critical properties that need to be controlled to ensure integrated circuit device integrity and reliability. These properties can be measured by an atomic force microscope (AFM) operated in dynamic mode. In dynamic mode operation the AFM tip is oscillated near the cantilever resonance frequency with the oscillating amplitude and phase monitored by a detection mechanism and AFM electronics.

As the AFM tip gradually approaches the sample surface, it will first enter a van der Waal force field (the so called non-contact attractive force interaction regime) or other attractive force fields, such as magnetic, capacitive, electric, friction, lateral, and capillary (mediated by a condensing vapor such as water) fields. Because the van der Waal force field is the most prevalent one, the discussion of the invention will be primarily focused on this force field, even though the invention can also be applied to other attractive force fields. Due to the attractive force field, the oscillating amplitude will monotonically decrease, and the phase signal will also monotonically decrease (or increase, depending on the implementation with different phase detection electronics) with decreasing tip-to-sample distance. Further decrease of the tip-to-sample distance will cause intermittent hard contact between the tip and the sample surface along with an abrupt and sharp reversal of the phase signal.

In practical roughness measurements and morphology imaging by an AFM tool, the amplitude decrease or phase change (increase or decrease) due to tip-to-sample force field interaction will be maintained at a constant value by a feedback control mechanism, and a mechanical apparatus will scan the tip laterally and simultaneously move the tip up and down to follow the contour of the sample topography. During AFM operation, the feedback electronics will be provided with an amplitude reference signal or a phase reference signal termed the feedback setpoint, and the feedback mechanism will try to maintain the actual tip oscillating amplitude or phase the same as the feedback setpoint. It is desirable to operate this constant feedback setpoint at a value such that a pure non-contact attractive interaction between the tip and the sample is ensured, thus preventing the AFM tip from even momentarily making hard contact with the sample surface. Such hard contact usually causes AFM tip damage and the loss of accuracy and precision. Therefore, a critical feedback setpoint where the onset of hard contact occurs should be determined precisely, and the AFM will typically be operated at an amplitude setpoint that is above this critical setpoint—or a phase setpoint that occurs before this critical setpoint whether above or below—to ensure non-contact attractive interaction between the tip and the sample.

The traditional method for determining this critical feedback setpoint dividing the attractive force interaction regime and the repulsive force interaction regime is to approach and retract the AFM tip towards and away from the sample surface repeatedly with the feedback mechanism being turned off while monitoring the amplitude and phase signals of the AFM cantilever vibration. When the amplitude feedback scheme is to be employed during subsequent AFM operation, the critical feedback setpoint is determined by the small deviation in the monotonic relationship between the amplitude decrease and tip-to-sample distance decrease. However, in this measurement, the tip is repeatedly rammed into the sample surface with no control at all and the tip will certainly be damaged during the measurement. Due to tip damage, the critical setpoint measured may be grossly inaccurate.

Accordingly, what is needed is a method of determining the critical feedback setpoint value without damaging the probe tip and employing an appropriate feedback setpoint value above the critical value during AFM scanning with an amplitude feedback scheme to remain in non-contact mode.

SUMMARY OF THE INVENTION

One embodiment of the invention provides a method of automatically detecting a setpoint useful in controlling a tip-to-sample distance of an atomic force microscope (AFM). The method generally consists of modulating the tip-to-sample distance of the AFM by adjusting a setpoint of a feedback mechanism of the AFM, monitoring a detector signal provided by a detector mechanism in order to detect an event indicative of an abrupt change or an approaching abrupt change in the detector signal, and using a setpoint corresponding to the detected event to subsequently control the AFM.

Another embodiment of the invention provides a method of automatically detecting a setpoint useful in controlling a tip-to-sample distance of an atomic force microscope (AFM). The method generally consists of adjusting a tip of the AFM relative to a sample to establish an initial tip-to-sample distance, enabling a feedback mechanism, reducing an amplitude setpoint of the feedback mechanism, thereby causing a reduction of the tip-to-sample distance, monitoring at least a phase signal provided by a detector, repeating the previous two steps until an abrupt change or approaching abrupt change in the phase signal provided by the detector is detected, and recording an amplitude setpoint corresponding to the detected change in the phase signal for subsequent use in operating the AFM.

Another embodiment of the invention provides for an atomic force microscope apparatus. The apparatus generally includes a probe having a probe tip mounted on a cantilever, a detector mechanism responding to movement of the probe tip, a feedback mechanism providing a feedback signal, and control logic. The control logic is configured to automatically detect a setpoint useful in controlling a tip-to-sample distance between the probe tip and a sample by modulating the tip-to-sample distance of the AFM apparatus by adjusting a setpoint of a feedback mechanism of the AFM apparatus, monitoring a detector signal provided by the detector mechanism in order to detect an event indicative of an abrupt change or an approaching abrupt change in the detector signal, and using a setpoint corresponding to the detected event to subsequently control the AFM apparatus.

Another embodiment of the invention provides for a computer-readable medium containing a program for automatically detecting a setpoint for use in operating an atomic force microscope. When the program is executed by a processor, it performs operations such as modulating the tip-to-sample distance of the AFM by adjusting a setpoint of a feedback mechanism of the AFM, monitoring a detector signal provided by the detector mechanism in order to detect an event indicative of an abrupt change or an approaching abrupt change in a detector signal, and using a setpoint corresponding to the detected event to subsequently control the AFM.

BRIEF DESCRIPTION OF THE DRAWINGS

This invention and some of its advantages can be better understood by reference to the following detailed description, considered in connection with the accompanying drawings, wherein.

DETAILED DESCRIPTION

The present invention provides a means to determine and use a critical feedback setpoint with an atomic force microscope (AFM) in an effort to avoid tip damage and remain in non-contact attractive mode during use.

An Exemplary AFM System

Figure 1:
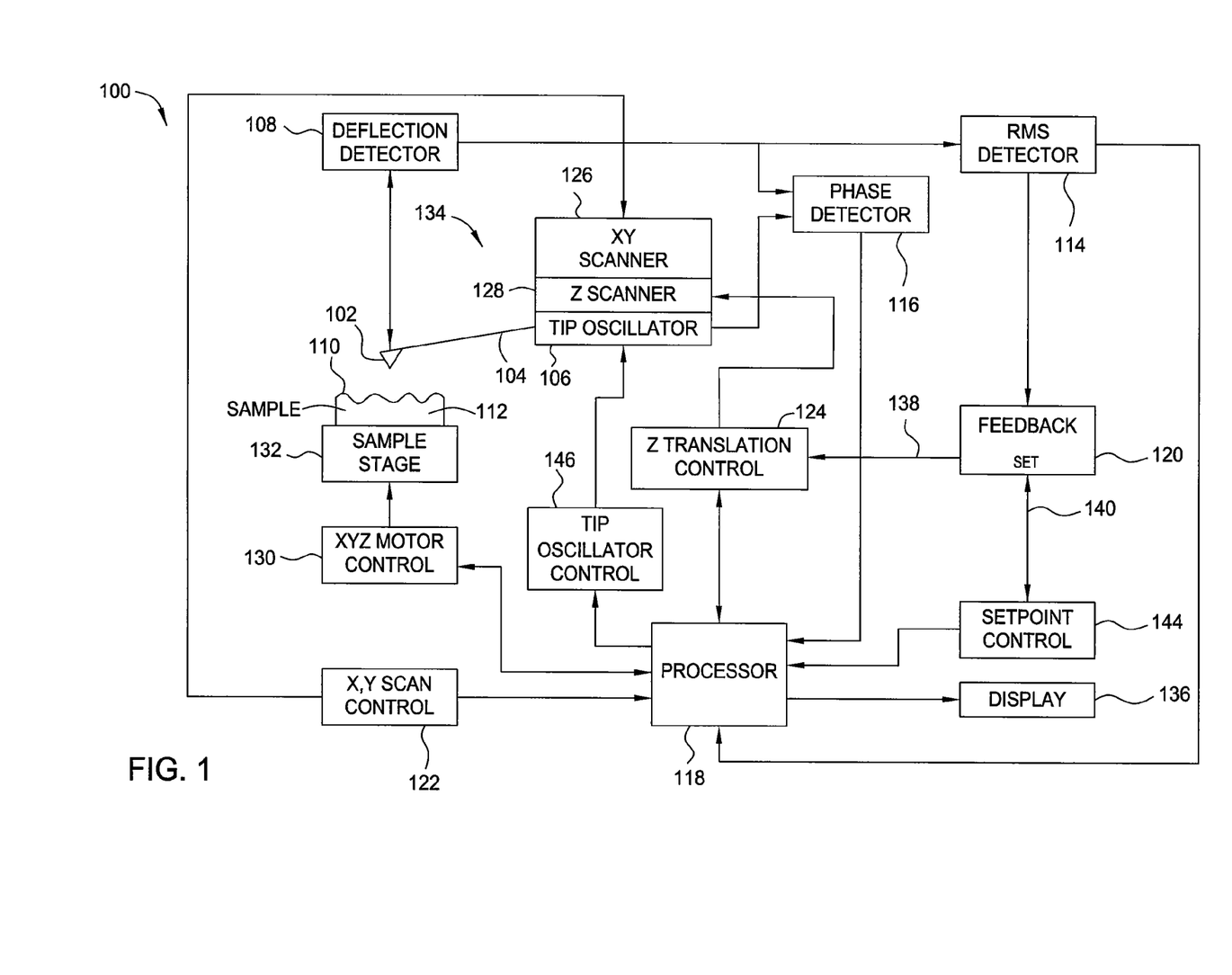
FIG. 1 is a simplified functional block diagram of an atomic force microscope including a probe/sample positioning apparatus and a feedback system using an amplitude feedback setpoint in accordance with one embodiment of the present invention.

FIG. 1 is a simplified functional block diagram of an atomic force microscope 100 for dynamic mode operation including a probe/sample positioning apparatus and a feedback system using an amplitude feedback setpoint 140 in accordance with one embodiment of the present invention. A phase feedback setpoint (not shown) may be employed in other embodiments of the invention, although this description will focus primarily on an amplitude feedback setpoint 140 to maintain consistency and avoid confusion.

A probe tip 102 on the end of a cantilever 104 may be oscillated at a known free oscillation amplitude and frequency near the cantilever resonant frequency by a tip oscillator 106. The cantilever resonant frequency may be around 300 kHz, and therefore, the tip 102 may be oscillated at a free oscillation frequency of 300.125 kHz during dynamic mode operation. For some embodiments, a tip oscillator control 146 may be programmed with the desired free oscillation amplitude and frequency, or the tip oscillation may be controlled directly by a processor 118.

The amplitude of the tip oscillation may be sensed by a deflection detector 108, possibly via optical perturbations, as part of a deflection mechanism (not shown in its entirety). For optical deflections, the deflection mechanism may comprise any suitable means of light generation, such as a laser or LED light, in an effort to bounce the light off the back of the cantilever. The deflection detector 108 for detecting this deflected light may be a position-sensitive light detector or a laser interferometer.

As previously described, as the AFM tip approaches the sample surface, it will first enter a van der Waal force field (the so called non-contact attractive force interaction regime) or other attractive force fields, such as magnetic, capacitive, electric, friction, lateral, and capillary (mediated by a condensing vapor such as water) fields. For some embodiments, the deflection detector 108 may comprise a piezo resistance sensor, a capacitive sensor, or a magnetic sensor, for example, thereby providing a corresponding feedback signal indicative of the particular type of attractive force being sensed. In either case, the deflection detector 108 may convert the deflection signals into electrical signals for further processing and recording.

Calibration of such electrical signals to vibration amplitudes is known to those skilled in the art of operating atomic force microscopes. One method involves performing the steps of the traditional method for plotting an amplitude versus tip-to-sample distance curve as described above with a different test tip, but one of the same type as the tip that will actually be used for determining the critical feedback setpoint in embodiments of the present invention. Another method involves using tapping mode, whereby the probe tip 102 is vibrated with a free space amplitude of 20 nm or higher, in an effort to get better resolution during calibration.

No matter what type of deflection mechanism is used, when the tip 102 is sufficiently far away from a surface 110 of a sample 112, it may continue to oscillate at the free oscillation amplitude, but when it is brought nearer to the surface 110, Van der Waal forces—or other attractive forces such as electrical, capacitive, magnetic, or capillary—may dampen the oscillation and cause the amplitude to decrease. Electronics (e.g. an rms detector 114 and a phase detector 116) may measure the amplitude and phase response of the sensed tip deflections. In FIG. 1 the detected phase is sent directly to the processor 118. For some embodiments, the phase detector 116 may also measure the phase of the free oscillation and output a phase difference, or both the detected signal phase and the free oscillation signal phase may be sent to the processor 118. The rms detector 114 may convert the detected signal amplitude into a DC voltage that may be sent to the processor 118. This converted amplitude may also then be used as a feedback signal 138, an input to a feedback mechanism 120 for a portion of the probe/sample positioning apparatus.

The probe/sample positioning apparatus may comprise an xy scan control 122, a z translation control 124, an xy scanner 126, a z scanner 128, an xyz motor control 130, and a sample stage 132. Combinations of these may move either a probe assembly 134 or the sample 112, whereby the probe assembly 134 may comprise at a minimum the cantilever 104, the tip 102, the tip oscillator 106, and the deflection detector 108. For some embodiments, the xyz motor control 130 may be capable of moving the sample stage 132 along all three axes, thereby providing xy scanning and a coarse adjustment mechanism for z-travel of the sample 112, which normally is disposed atop the sample stage 132 during use of the AFM 100. The xy scan control 122 may regulate the lateral movement of the probe assembly 134 in the xy plane during scanning or any other time it is necessary to move the probe assembly 134 laterally and may send instructions to the xy scanner 126 for actual motion. The z translation control 124 may direct the movement of the probe assembly 134 up and down in relation to the surface 110 based on the feedback signal 138 and a feedback setpoint 140 labeled "SET" in FIG. 1. Fine adjustment of the probe height is provided by the z scanner 128, which receives commands from the z translation control 124. The fine adjustment mechanism of the z scanner 128 may comprise a piezo stack or piezo tube.

The processor 118 may monitor and/or control the xy scan control 122, the z translation control 124, the detected phase or phase difference from the phase detector 116, the detected rms amplitude from the rms detector 114, and a setpoint control 144. For some embodiments, the processor 118 may output the elements necessary for a topographic image (or surface roughness measurement), phase imaging, phase vs. setpoint graphing, phase vs. tip-to-sample distance graphing (z translation control signal), rms amplitude vs. tip-to-sample distance graphing (z-translation control signal), or phase vs. setpoint graphing to a display 136 and/or storage device (not shown). As mentioned above, either the xy scanner 126 or the xyz motor control 130 can be operated in an effort to control scanning movement of the probe 134 or the sample stage 132, respectively, in the xy axes during AFM imaging.

In the amplitude feedback setpoint scheme of FIG. 1, turning the feedback mechanism 120 on allows for closed loop control of the AFM. The feedback mechanism 120 may send a signal to the z translation control in an effort to keep the feedback setpoint 140 and the feedback signal 138 at the same value, thereby operating the AFM 100 in constant force mode. Those skilled in the art of atomic force microscopy will appreciate that in constant force mode, or height mode as it sometimes referred to, the probe/sample positioning apparatus which moves the probe assembly 134 or sample 112 up and down can respond to any changes in force detected between the tip 102 and the sample 112. The positioning apparatus may then alter the tip-to-sample distance to restore the force to a predetermined value, the feedback setpoint 140. If a proper feedback setpoint 140 is selected corresponding to a correctly determined critical feedback setpoint value for a given type of probe tip 102, then the atomic force microscope 100 will operate in the non-contact attractive regime and avoid tip damage while imaging a surface. As mentioned previously, some embodiments of the invention may use a phase feedback setpoint instead.

For some embodiments of the present invention, the processor 118 and the setpoint control 144 may be configured (e.g. through executable software) to automatically determine the critical feedback setpoint value as described below by monitoring the phase signal from the phase detector 116 and inspecting the signal for sudden or impending abrupt changes as the feedback setpoint 140 is swept. Once the critical value has been determined, the desired feedback setpoint value to maintain non-contact interaction may be stored in internal memory of the setpoint control 144 or in an external memory location (not shown), or it may be programmed as an input to the AFM 100.

The overall AFM 100 may employ a vibration isolation mechanism (not shown). This mechanism may serve to isolate the AFM 100 from external vibration and acoustic noise during operation or critical feedback setpoint value determination.

Figure 2A:
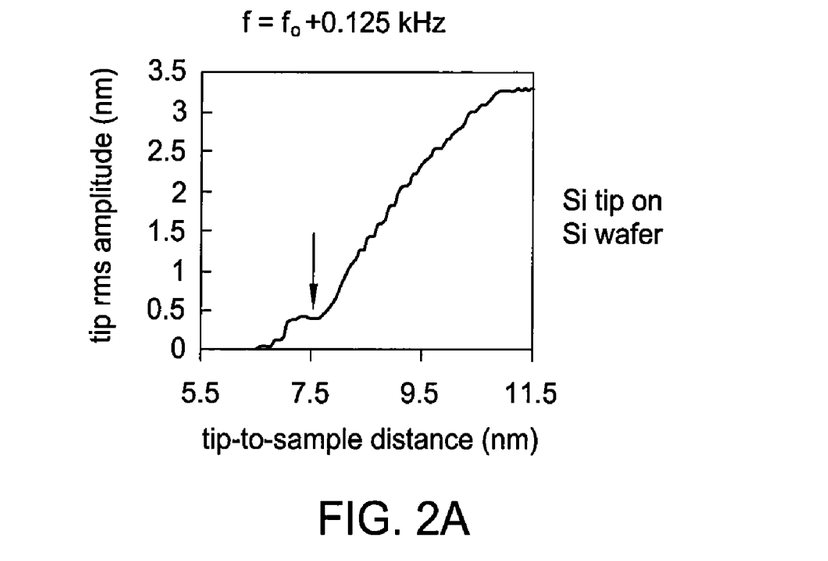
FIG. 2a is a graph, obtained by traditional methods, of tip rms amplitude vs. tip-to-sample distance in nanometers during tip approach to a surface illustrating a monotonic decrease in amplitude with decreasing tip-to-sample distance until intermittent hard contact between the tip and the sample surface occurs.

FIG. 2a shows a conventional graph 200 of the AFM tip vibration amplitude versus tip-to-sample distance obtained by traditional methods. In the illustrated example, it can be seen that the tip amplitude starts to decrease at 3.4 nm signaling the beginning of the van der Waal interaction, and a small deviation from the monotonic decreasing relationship occurs at the tip amplitude 0.4 nm. The arrow 202 in FIG. 2a points to the location where hard contact between the tip and the sample supposedly starts to occur. Therefore, the non-contact attractive interaction regime is considered to range from 3.4 nm to 0.4 nm and from this it might be assumed that the initial 88% ((3.4 nm-0.4 nm)/3.4 nm) of the amplitude reduction is caused by non-contact attractive interaction. However, this is an erroneous assumption, which may be primarily caused by tip damage during the determination of the critical feedback setpoint using a traditional method.

Figure 2B:
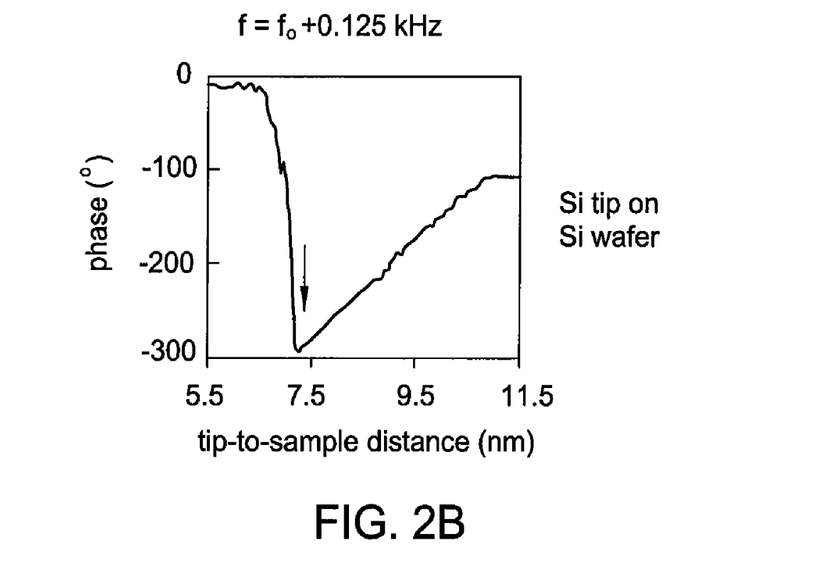
FIG. 2b is a graph, obtained by traditional methods, of phase in degrees vs. tip-to-sample distance in nanometers during tip approach to a surface illustrating a monotonic change in phase with decreasing tip-to-sample distance until intermittent hard contact between the tip and the sample surface occurs coinciding with an abrupt change in phase.

Since the phase signal is typically also being monitored during AFM measurements, a sharp reversal in phase can also be used to determine the onset of intermittent hard contact between the tip and the sample in the traditional manner. FIG. 2b illustrates the phase versus tip-to-sample distance relationship 210, and again, the arrow 212 in the figure points to where the onset of hard contact between the tip and the sample is erroneously thought to occur.

Explanation of Inter-Molecular Forces

Figure 3:
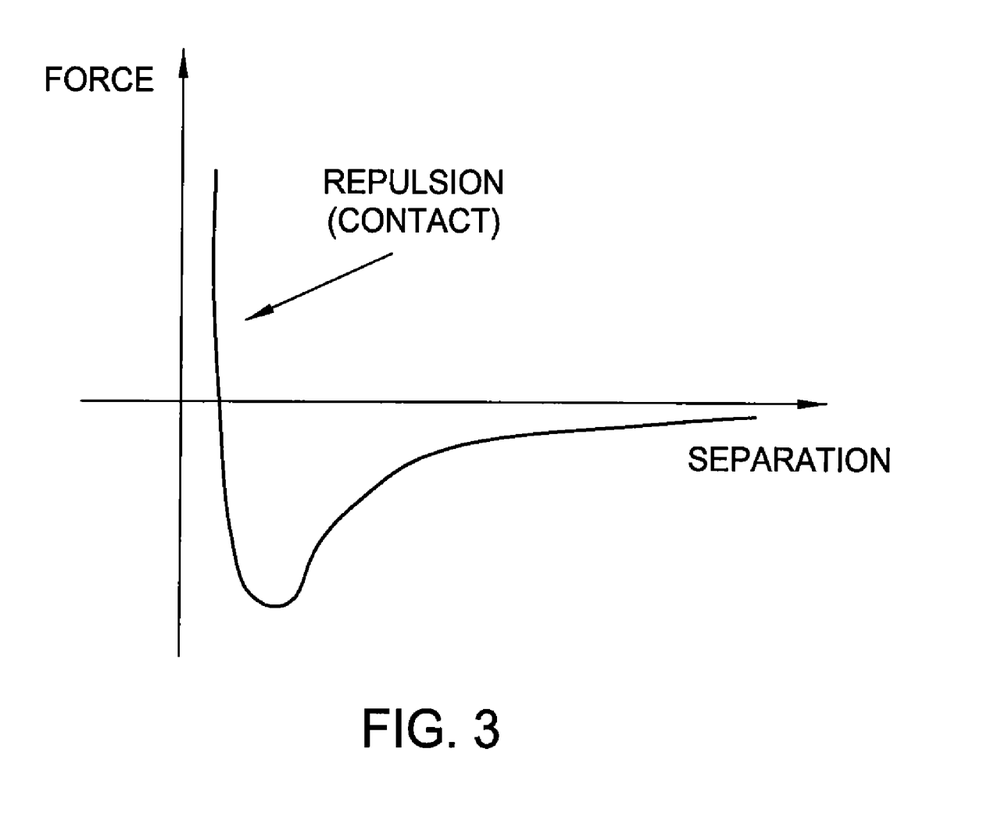
FIG. 3 is a representative inter-molecular force curve illustrating a shift from an attraction regime to a repulsion regime with decreasing distance between molecules.

To aid in understanding why this phase reversal occurs, FIG. 3 is a representative inter-molecular force curve illustrating a shift from an attraction regime to a repulsion regime with decreasing distance between molecules. The tip-to-sample van der Waal force is generally modeled by the interaction of a sphere with radius R (the radius of curvature of the AFM tip) with a plane of infinite extension. The equation is $$F_{vdW} = -H*R/(6*z_o^2) \qquad (1)$$

where $F_{vdW}$ is the van der Waal force in newtons, H is the Hamaker constant in joules, and $z_o$ is the tip-to-sample distance in meters when the tip is at its rest equilibrium position.

Using a point mass hanging on a mass-less spring model, the equation of motion of the AFM tip under the influence of the van der Waal force field is $$m*dz^2/dt^2 + m*\omega_o/Q*(dz/dt) + k*z = F_{vdW} + F_o*\cos(\omega*t) \qquad (2)$$

where m is the equivalent mass in kilograms, z is the tip position in meters relative to its equilibrium tip-to-sample position $z_o$, t is the time in seconds, Q is the unitless quality factor of the spring, k is the force constant of the spring in newtons per meter, $F_o$ is the amplitude of external oscillation force in newtons, $\omega_o$ is the angular resonance frequency of the spring in radians per second, and $\omega$ is the angular frequency of the external oscillation force in radians per second. At small tip oscillation amplitudes, $$F_{vdW} \supset F_{vdW}'(z_o)*z \qquad (3)$$

where $F_{vdW}'(z_o)$ is the derivative of the van der Waal force at the equilibrium tip-to-sample position $z_o$ in newtons. Based on equation (1), $$F_{vdW}(z_o)'=H*R/(3*z_o^3) \quad (4)$$

The force derivative $F_{vdW}'$ increases monotonically as tip-to-sample distance ($z_o$) is decreased.

The phase change as a function of tip-to-sample distance can be shown to be $$\phi(z_o)=\arctan[\omega*\omega_o/(\omega_o^2-\omega^2-F_{vdW}'(z_o)] \quad (5)$$

In a free space far away from the van der Waal force field, the force derivative term $F_{vdW}'$ term will be zero. Because $\omega$ is very close to $\omega_o$, $\phi$ will be close to 90° in free space. As the tip moves into the van der Waal force field, the $F_{vdW}'$ term will no longer be zero; the closer the tip gets to the surface, the larger the $F_{vdW}'$ term and hence the larger the phase shift ($\phi$). In some implementations of AFM, the phase detection circuit shifts the free space $\phi$ to another value such as 0° and also dictates that $\phi$ becomes smaller as the tip comes closer to the sample surface.

If the tip oscillation amplitude is large, the above simplified approach can no longer be used. Also, the treatment of the tip and sample interaction in the intermittent contact regime is complicated by the nonlinear nature of the interaction. Therefore, a numerical solution is often used. The numerical solution shows that as the tip enters the van der Waal force field, the phase signal changes monotonically with the continuous decrease of tip-to-sample distance. Once the intermittent contact between the tip and sample starts, a sudden reversal of the phase will happen [Reference: R. Garcia and A. San Paulo, Phys. Rev. B. 60, 4961-4966 (1999)].

No matter whether amplitude or phase is being used to determine a critical feedback setpoint, traditional methods all have the great disadvantage of causing tip damage during the uncontrolled approach and withdraw of the AFM probe tip 102. Once the tip 102 is damaged, the critical feedback setpoint value determined will no longer be accurate for fresh, undamaged tips.

Automatic Setpoint Determination

Figure 4:
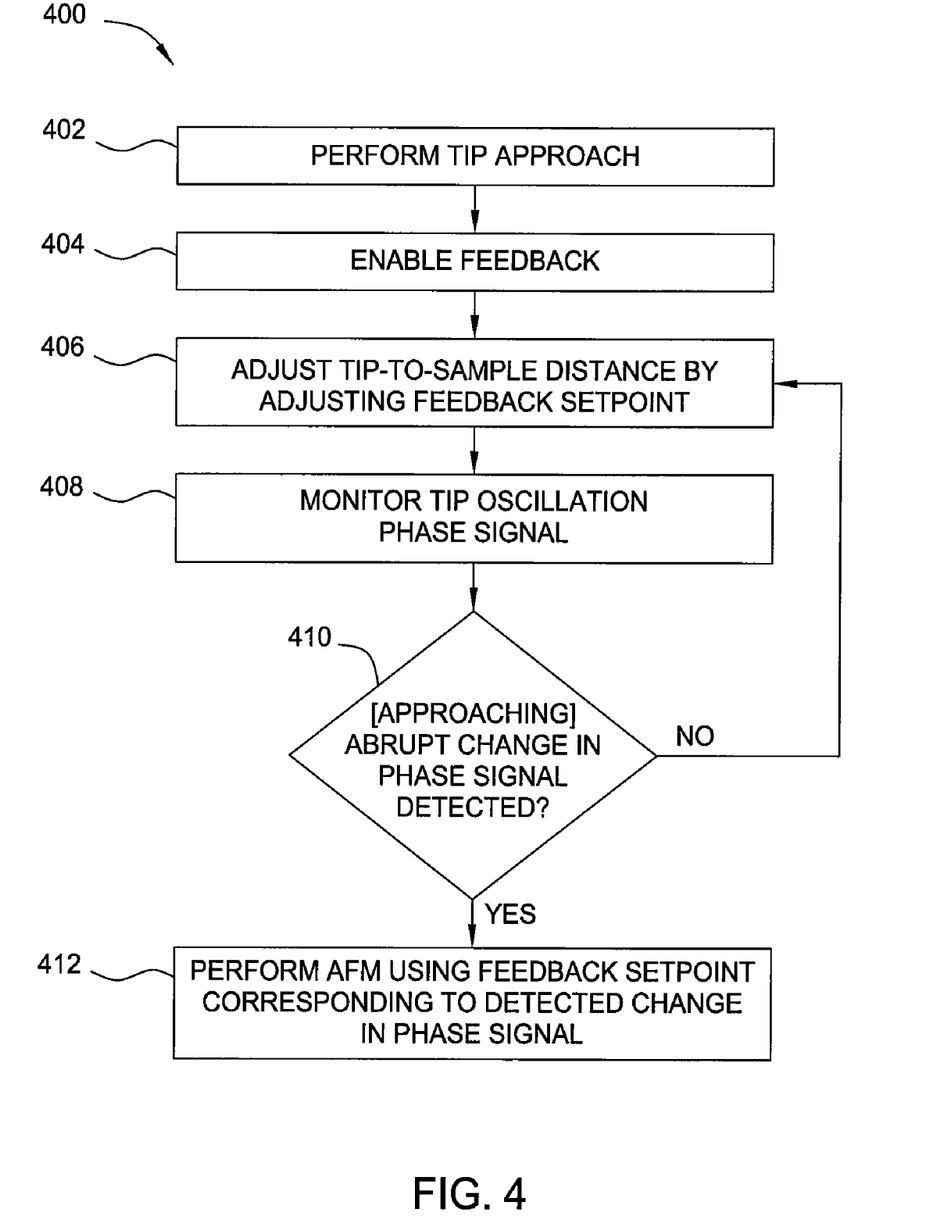
FIG. 4 is a flow chart depicting the determination of a feedback setpoint using the atomic force microscope while monitoring a phase signal according to one embodiment of the present invention.

FIG. 4 is a flow chart 400 depicting the automatic determination of the critical feedback setpoint using the atomic force microscope 100 while monitoring a phase signal according to one embodiment of the present invention. The operations described herein may be performed, for example, by the processor 118 and setpoint control 144 as part of a calibration routine for a given tip/sample combination.

In step 402, a tip approach operation is performed. As part of the tip approach operation, the AFM probe tip 102 may be brought closer to the sample surface 110 with feedback mechanism 120 turned off, but the tip 102 should be kept outside of the van der Waal force field, far enough away that it is oscillating at the free oscillation amplitude and frequency. For some embodiments, the tip approach operation may involve physically moving the tip 102 closer to the sample 112, and other embodiments may involve moving the sample 112 instead. There are at least two methods of performing the tip approach operation.

The preferred tip approach method may ensure that the tip 102 stops at the fringe of the van der Waal force field and avoids tip damage. To avoid the tip 102 crashing onto the surface 110 of the sample 112, the detector amplitude or phase signal may be monitored during this method of tip approach. The approach should be stopped at a tip-to-sample distance where there is an abrupt reduction in tip amplitude or an abrupt phase change as a function of tip-to sample distance. Such abrupt changes may be more easily detected by differentiating the amplitude or phase signal. At the end of this tip approach method, the fine approach mechanism (e.g. the z scanner 128) should be at the center of its motion range.

In another tip approach method, the initial coarse approach may be performed by simply setting the amplitude reduction target to an arbitrary low value (e.g. 10%). This initial amplitude reduction may be analogous to a similar reduction mainly caused by a phenomenon known as air foil damping. The air foil is a layer of air between a bottom surface of the cantilever 104 and the sample surface 110. The vibrating cantilever 104 may transfer energy to the air foil through the compression and expansion of the air trapped between the two surfaces. This effect, called air foil damping, can serve to reduce the amplitude of the vibrating cantilever 104. Air foil damping may have a longer range and a more gradual effect on the vibrating cantilever 104 than the van der Waal forces and other non-contact attractive forces as a function of tip-to-sample distance.

The feedback mechanism 120 is turned on in step 404. In step 406, the tip-to-sample distance may be adjusted slightly by adjusting the feedback setpoint 140. Typically, a reduction in the feedback setpoint 140 will reduce the tip-to-sample distance. The phase of the tip oscillation as detected by the phase detector 116 may be monitored in step 408. For some embodiments, the phase of interest may be the phase difference between the requested free oscillation amplitude signal input to the tip oscillator 106 and the oscillation at the end of the probe tip 102 as detected by the deflection detector 108. The feedback setpoint 140 and the measured phase from the phase detector 116 may be recorded for each setpoint. If there is a sudden or approaching sudden change in phase (as determined at step 410), then the critical feedback setpoint value is the value where the sudden phase change (or approaching change) occurred. For some embodiments, the phase signal may be differentiated as a function of the setpoint or tip-to-sample distance, and in this case, the differentiated function may be monitored for discontinuities typically accompanied with changes in polarity. In either case, the sudden changes may be indicative of a switch from a pure attractive interaction to a somewhat repulsive interaction as explained above. If the phase change of step 410 did not occur, then the process may be repeated beginning with step 406 until a critical feedback setpoint value is determined.

There may also be the possibility that the abrupt change of phase with tip-to-sample distance decrease will not be observed for certain combinations of tip material and sample material. Instead, a gradual reversal may be detected, which typically occurs when a small free oscillation amplitude (e.g. 4.4 nm) is used. In such cases, the invention can unambiguously detect such behavior, and the critical setpoint can be set near the turning point of the gradual reversal. In other cases, a predetermined threshold may be reached defining the maximum allowable phase difference as measured by the phase detector 116 (i.e. the difference in phase between the oscillation at the end of the probe tip 102 as detected by the deflection detector 108 and the requested free oscillation amplitude signal input to the tip oscillator 106). For some embodiments, this phase difference threshold may be set to 45°, while other embodiments may use a threshold closer to 90° depending on the tip/sample combination.

There may also be the possibility that the van der Waal force field range will be outside the z-travel range of the fine approach mechanism (e.g. the z scanner 128). In this case, the coarse tip approach may be performed as described above followed by moving the tip 102 further towards the sample surface 110 by about half the range of the fine approach mechanism. Repeat steps 404 to 410 to determine the critical feedback setpoint value. If the expected abrupt change is still not observed, the tip 102 can be repeatedly moved closer to the sample surface 110 by incremental distances of half the range of the fine approach mechanism, and steps 404 and 410 can be repeated until the critical setpoint value is determined.

At step 412, the AFM may be operated using a feedback setpoint 140 corresponding to this critical feedback setpoint value and normally higher than the critical value. For some embodiments, the tip 102 may be raised from the tip-to-sample distance corresponding to the critical setpoint to minimize damage, but even if the tip 102 is slightly damaged, the critical feedback setpoint value is still valid since the damage happened right at the onset of intermittent contact. Once the critical setpoint has been determined for a certain AFM tip/sample combination and AFM operating condition (mainly the initial free oscillation amplitude), it can be applied to the same type of tip/sample combination and the same AFM operating conditions.

Figure 5:
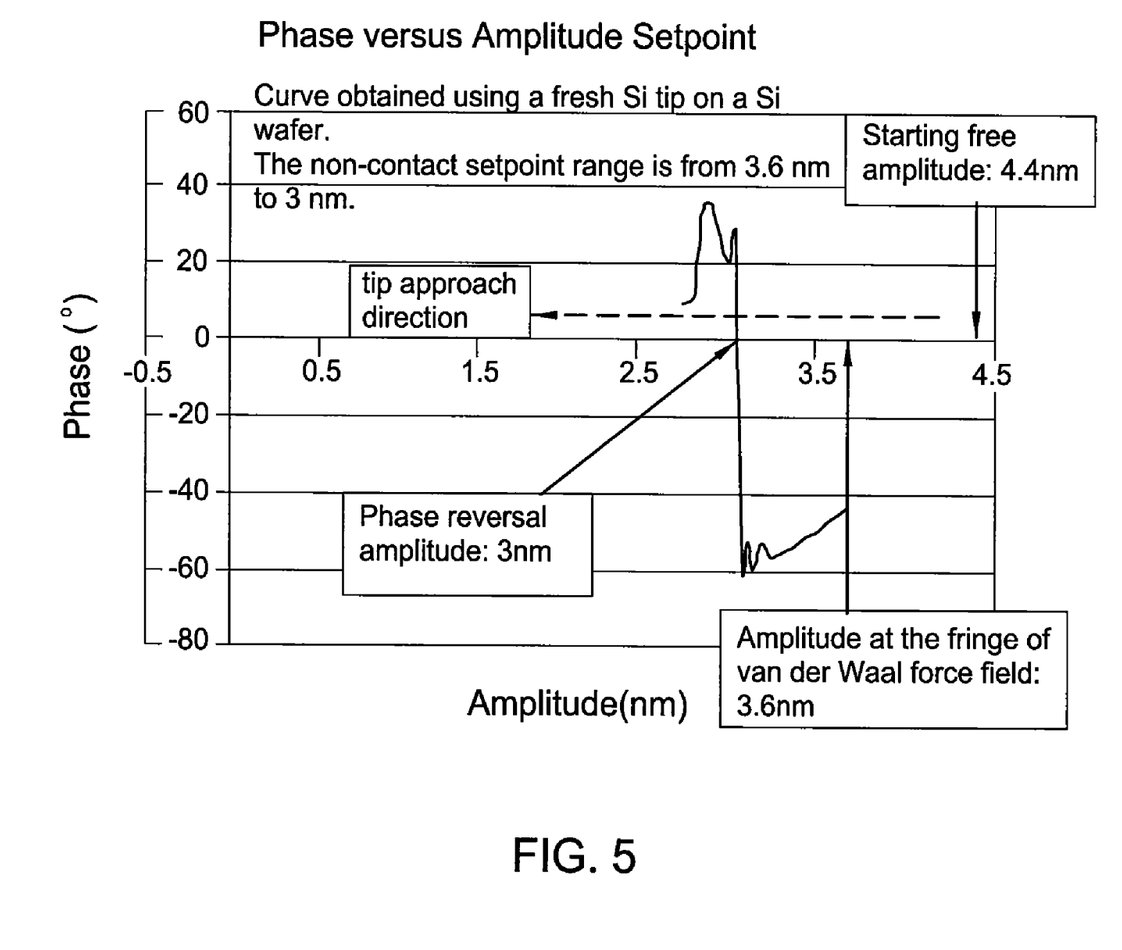
FIG. 5 is a graph of phase in degrees vs. an amplitude feedback setpoint in nanometers for a specific tip/sample combination at a particular free oscillation amplitude according to one embodiment of the present invention.

FIG. 5 is a graph 500 of phase in degrees vs. feedback setpoint in nanometers illustrating the details and result of running the process steps of FIG. 4 for a specific tip/sample combination at a particular free oscillation amplitude according to one embodiment of the present invention. The graph 500 was obtained using a new Si probe tip above the surface of a Si wafer operated with a free oscillation amplitude of 4.4 nm. The onset of Van der Waal forces occurred at 3.6 nm. From the label "tip approach direction," one can tell that the detected tip oscillation amplitude decreases as the tip-to-sample distance decreases. The sharp phase reversal in FIG. 5 occurs at 3.0 nm, and this is the critical feedback setpoint value for this tip/sample combination at the specific free oscillation amplitude. The feedback setpoint for operating the AFM 100 may be chosen anywhere within the non-contact range (3.0 nm to 3.6 nm).

Since the sample composition, local charge, and other anomalies can affect the value of the critical feedback setpoint, a data set may be collected over a plurality of sample surface coordinates, and then the proper critical feedback setpoint value may be determined. For instance, the critical value may be selected as the maximum value of such a data set to further ensure that the probe tip 102 will not make intermittent hard contact across the entire sample surface 110. This recording of amplitude vs. phase curves from the plurality of sample surface coordinates can be used as a method to map sample surface properties such as detecting anomalously strong interactions between the tip and sample surface caused by locally stored charge. Other interesting information may be observed and collected regarding the correlations between the critical feedback setpoint value, the type of tip, the type of sample, the charge distribution of the sample surface, and the free oscillation amplitude.

Figure 6:
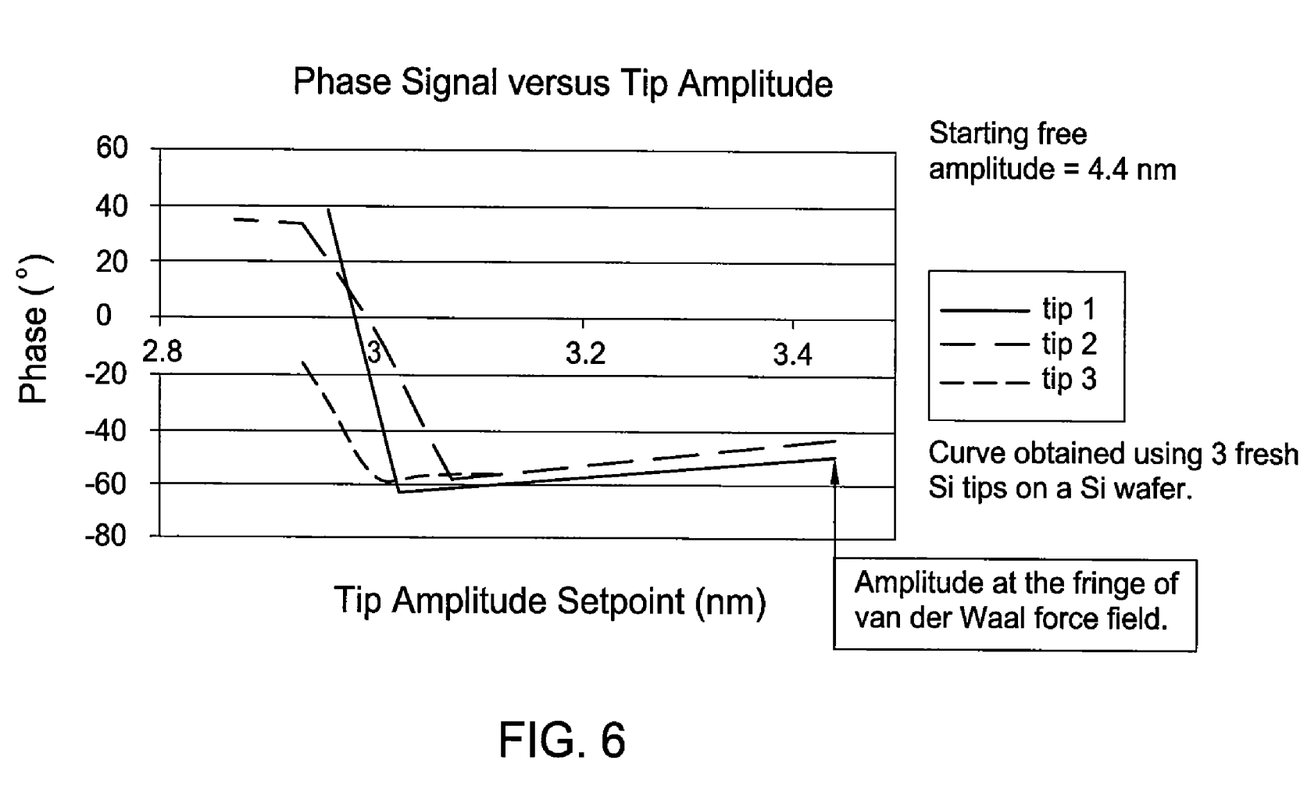
FIG. 6 is a graph of phase in degrees vs. the amplitude feedback setpoint in nanometers for three new tips as determined by one embodiment of the present invention, illustrating how tips of the same type yield nearly the same critical feedback setpoint value, all other variables being the same.

The accurately determined critical feedback setpoint value may be valid for different AFM probe tips of the same type. FIG. 6 is a graph 600 of phase in degrees vs. feedback setpoint in nanometers for three new tips as determined by one embodiment of the present invention. For a specific tip/sample combination and free oscillation amplitude of one experiment, the exact critical feedback setpoints are 2.96 nm, 3.00 nm, and 2.93 nm for tips 1-3, respectively. If we consider the critical feedback setpoint to be 3.00 nm, then only the first 13% ((3.44 nm-3.00 nm)/3.44 nm) of tip amplitude decrease from 3.44 nm is attributable to non-contact attractive interaction between the tip and sample surface. The operating feedback setpoint should then be between 3.44 nm and 3.00 nm, a much narrower range than the 0.4 nm to 3.4 nm obtained by the traditional method with the same tip/sample combination.

Automatic Setpoint Determination for Different Free Oscillation Amplitudes

Figure 7:
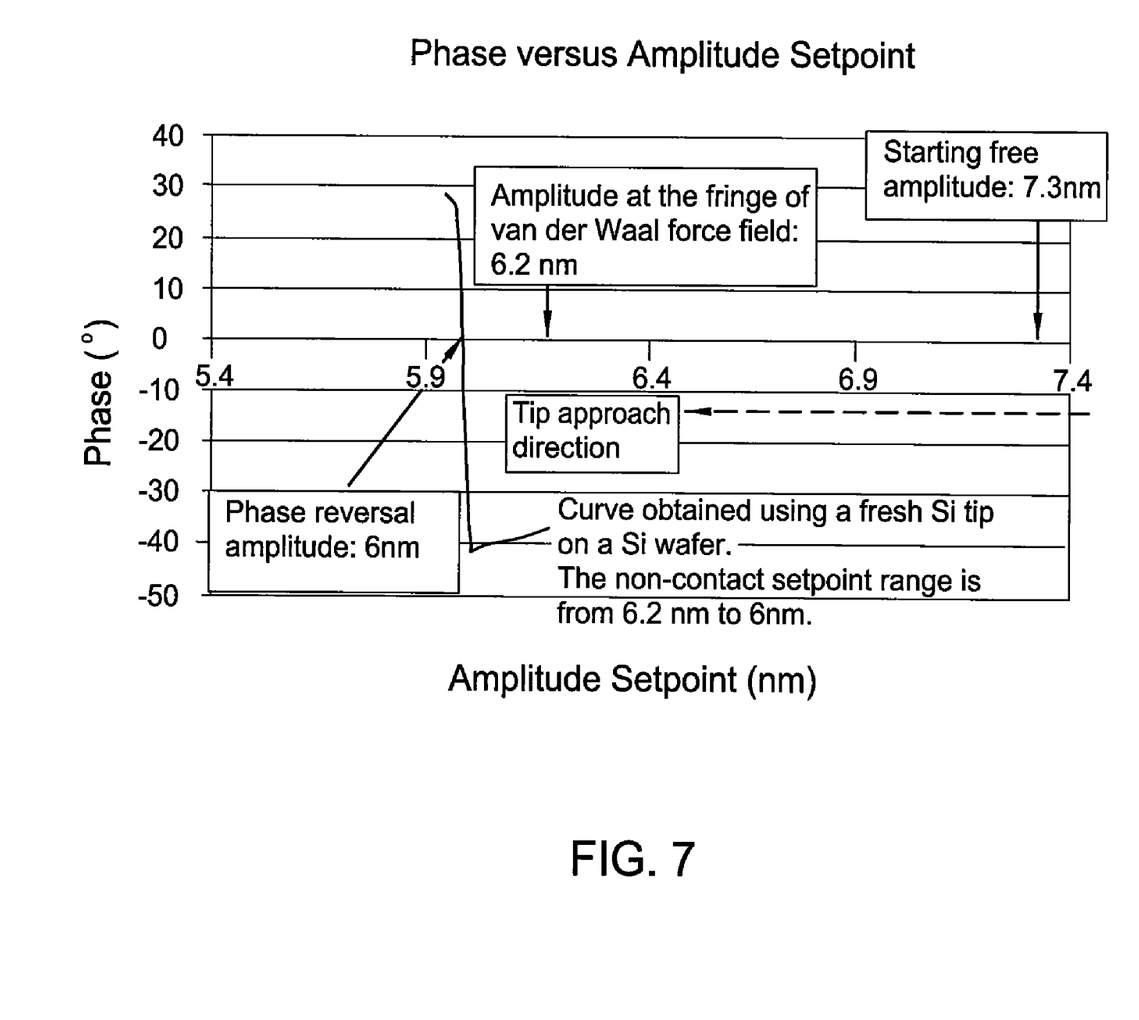
FIG. 7 is a graph of phase in degrees vs. amplitude feedback setpoint in nanometers for the same tip/sample combination as FIG. 5, but with a different free oscillation amplitude.

Different free oscillation amplitudes of the AFM probe tip 102 can yield different critical setpoint values. Proof of this can be seen by comparing FIG. 5 to FIG. 7 where the tip oscillator 106 was operated with different free oscillation amplitudes of 4.4 nm and 7.3 nm, respectively. Even though the tip/sample combination was of the same type (new Si tip above a Si wafer), the resulting critical feedback setpoint values were different (3.0 nm versus 6.0 nm).

Since different free oscillation amplitudes and, to a lesser extent, frequencies can yield different critical feedback setpoint values, it may be desirable to create a table of critical feedback setpoint values for different free oscillation amplitudes and/or frequencies for a given tip/sample combination. This may be done as a calibration step prior to shipping the AFM and may involve different tips, different samples, and different oscillation amplitudes or frequencies that a given customer may expect to use. In this manner, an AFM may be shipped ready for use with different probe tips without requiring additional calibration.

Figure 8:
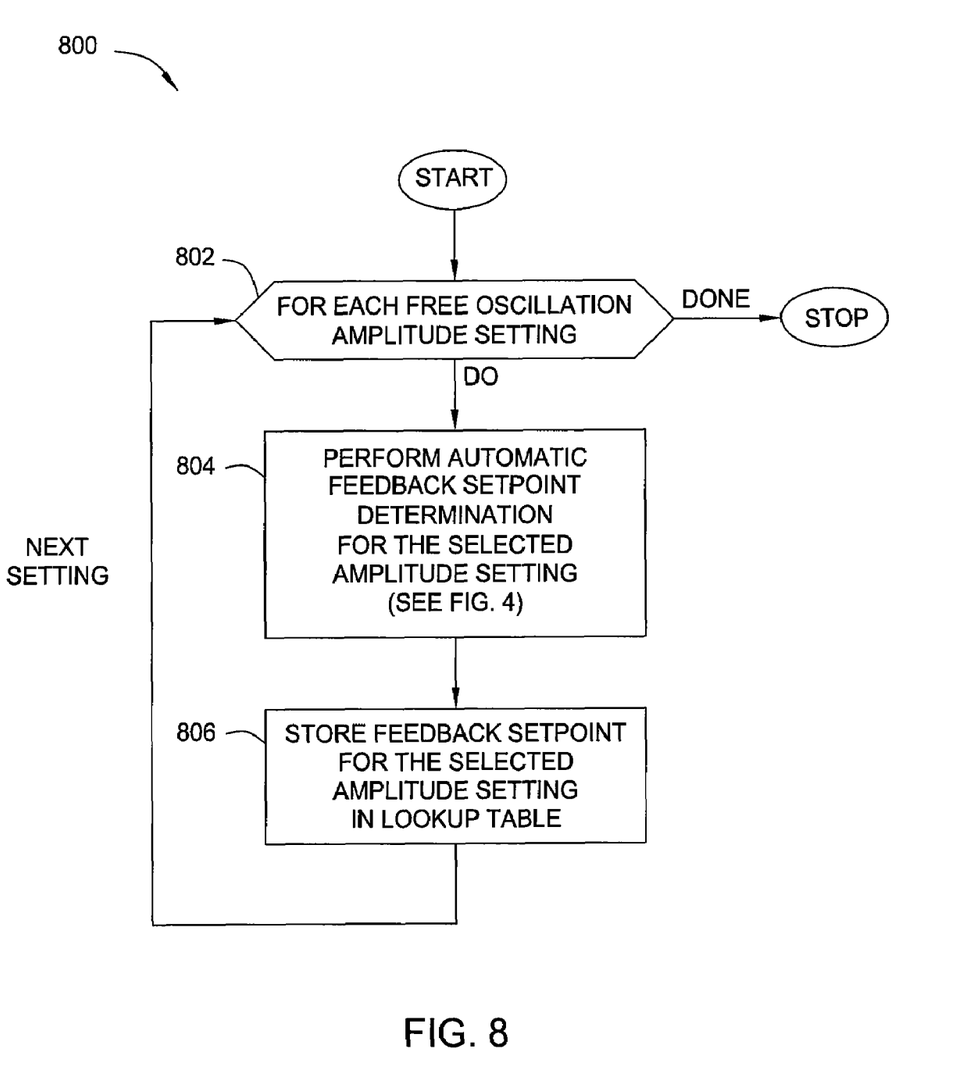
FIG. 8 is a flow chart depicting the generation of a lookup table comprising critical feedback setpoint values as a function of free oscillation amplitude.

FIG. 8 is a flow chart 800 depicting the generation of such a lookup table comprising critical feedback setpoints as a function of free oscillation amplitude. Given a list of free oscillation amplitudes that might be used with a given tip/sample combination, the AFM tip oscillator 106 may be operated with a selected free oscillation amplitude from the list (step 802). At step 804, the critical feedback setpoint value may be determined (as described above with reference to FIG. 4) while continuing to oscillate the tip 102 with the selected free oscillation amplitude. The resulting critical feedback setpoint value may be stored in a lookup table (step 806) corresponding to the free oscillation amplitude used. As long as there are more free oscillation amplitudes in the list, the process may be repeated from step 802.

Once all of the critical feedback setpoint values have been determined for all of the free oscillation amplitudes of interest, the lookup table has been completed, and the routine can be exited. The AFM may then be operated with different tips, with the setpoint for a particular tip (e.g., specified by a user) retrieved from the table.

Damaged Probe Tip Detection

Since a probe tip should repeatedly yield the same critical feedback setpoint value for a given free oscillation amplitude, frequency, and sample surface location, a calibration history of critical feedback setpoint values may be chronicled for a given probe tip. Damaged tips may yield a substantially different critical feedback setpoint value from fresh or undamaged tips by over 2 nm according to experiments with embodiments of the invention. Therefore, when a determination of the critical feedback setpoint deviates substantially from the recorded calibration history, damage to the tip may be suspected, and the tip should be replaced.

A reference sample surface with one or more reference locations may be used to determine a critical feedback setpoint value according to methods described above using the same free oscillation amplitude and frequency every time. This repeatable verification method may be performed at any time interval deemed necessary by the operator to assure quality AFM operation or when tip damage is suspected.

Furthermore, since a certain type of probe tip should yield approximately the same critical feedback setpoint value, a probe tip that deviated significantly from a calibration history of a probe tip of the same type may be detected as being damaged, as well, provided that the same AFM, reference sample, reference surface locations, and free oscillation amplitude and frequency were being used.

While the foregoing is directed to embodiments of the present invention, other and further embodiments of the invention may be devised without departing from the basic scope thereof, and the scope thereof is determined by the claims that follow.

The inventioned claimed is:

1. A method of automatically detecting a setpoint useful in controlling a tip-to-sample distance of an atomic force microscope (AFM), comprising:
   a) adjusting a tip of the AFM relative to a sample to establish an initial tip-to-sample distance;
   b) enabling a feedback mechanism;
   c) reducing an amplitude setpoint of the feedback mechanism, thereby causing a reduction of the tip-to-sample distance;
   d) monitoring at least a phase signal provided by a detector;
   e) repeating steps c)-d) until at least one of: an abrupt change or approaching abrupt change in the phase signal provided by the detector is detected;
   f) recording an amplitude setpoint corresponding to the detected change in the phase signal for subsequent use in operating the AFM; and
   g) repeating steps a)-f) using different AFM probe tips to generate a table of setpoints useful in controlling a tip-to-sample distance of an atomic force microscope (AFM) using the different probe tips.

2. The method of claim 1, wherein the method is performed as part of a factory calibration routine prior to shipping the AFM to a customer.

3. A method of automatically detecting a setpoint useful in controlling a tip-to-sample distance of an atomic force microscope (AFM), comprising:
   a) adjusting a tip of the AFM relative to a sample to establish an initial tip-to-sample distance;
   b) enabling a feedback mechanism;
   c) reducing an amplitude setpoint of the feedback mechanism, thereby causing a reduction of the tip-to-sample distance;
   d) monitoring at least a phase signal provided by a detector;
   e) repeating steps c)-d) until at least one of: an abrupt change or approaching abrupt change in the phase signal provided by the detector is detected;
   f) recording an amplitude setpoint corresponding to the detected change in the phase signal for subsequent use in operating the AFM; and
   g) repeating steps a)-f) using different samples to generate a table of setpoints useful in controlling a tip-to-sample distance of an atomic force microscope (AFM) using the different samples.

4. A method of automatically detecting a setpoint useful in controlling a tip-to-sample distance of an atomic force microscope (AFM), comprising:
   a) adjusting a tip of the AFM relative to a sample to establish an initial tip-to-sample distance;
   b) enabling a feedback mechanism;
   c) reducing an amplitude setpoint of the feedback mechanism, thereby causing a reduction of the tip-to-sample distance;
   d) monitoring at least a phase signal provided by a detector;
   e) repeating steps c)-d) until at least one of: an abrupt change or approaching abrupt change in the Phase signal provided by the detector is detected;
   f) recording an amplitude setpoint corresponding to the detected change in the phase signal for subsequent use in operating the AFM; and
   g) periodically repeating steps a)-f) to generate a calibration history of recorded amplitude setpoints, wherein a recorded amplitude setpoint that differs substantially from the calibration history of recorded setpoints indicates a damaged tip.

5. A method of automatically detecting a setpoint useful in controlling a tip-to-sample distance of an atomic force microscope (AFM), comprising:
   a) adjusting a tip of the AFM relative to a sample to establish an initial tip-to-sample distance;
   b) enabling a feedback mechanism;
   c) adjusting a phase setpoint of the feedback mechanism, thereby causing a reduction of the tip-to-sample distance;
   d) monitoring at least a phase signal provided by a detector;
   e) repeating steps c)-d) until at least one of: an abrupt change or approaching abrupt change in the phase signal provided by the detector is detected;
   f) recording a phase setpoint corresponding to the detected change in the phase signal for subsequent use in operating the AFM; and
   g) repeating steps a)-f) using different AFM probe tips to generate a table of setpoints useful in controlling a tip-to-sample distance of an atomic force microscope (AFM) using the different probe tips.

6. The method of claim 5, wherein the method is performed as part of a factory calibration routine prior to shipping the AFM to a customer.

* * * * *